(12) United States Patent
Coushaine et al.

(10) Patent No.: US 7,237,927 B2
(45) Date of Patent: Jul. 3, 2007

(54) LIGHT EMITTING DIODE LAMP WITH CONICALLY FOCUSED LIGHT GUIDES

(75) Inventors: Charles Coushaine, Rindge, NH (US); Michael Tucker, Henniker, NH (US); Thomas Tessnow, Weare, NH (US); Ralph Johnson, Bedford, NH (US); Steven Sidwell, Hopkington, NH (US)

(73) Assignee: Osram Sylvania Inc., Danvers, MA (US)

( * ) Notice: Subject to any disclaimer, the term of this patent is extended or adjusted under 35 U.S.C. 154(b) by 107 days.

(21) Appl. No.: 11/124,966

(22) Filed: May 9, 2005

(65) Prior Publication Data

US 2005/0281048 A1 Dec. 22, 2005

Related U.S. Application Data

(60) Provisional application No. 60/580,411, filed on Jun. 17, 2004.

(51) Int. Cl.
*F21V 13/14* (2006.01)

(52) U.S. Cl. .................... 362/252; 362/297

(58) Field of Classification Search ............... 362/252, 362/249, 297, 350, 555
See application file for complete search history.

(56) References Cited

U.S. PATENT DOCUMENTS

| 5,136,483 | A | * | 8/1992 | Schoniger et al. | .......... 362/545 |
| 5,592,578 | A | | 1/1997 | Ruh | |
| 6,527,411 | B1 | * | 3/2003 | Sayers | .......... 362/245 |
| 2002/0191395 | A1 | | 12/2002 | Fleury | |
| 2003/0219207 | A1 | * | 11/2003 | Guy | .......... 385/49 |
| 2005/0094401 | A1 | | 5/2005 | Magarill | |

FOREIGN PATENT DOCUMENTS

| EP | 1 466 807 | 10/2004 |
| WO | WO 02/97325 | 5/2002 |

* cited by examiner

*Primary Examiner*—Thomas M. Sember
*Assistant Examiner*—Julie A. Shallenberger
(74) *Attorney, Agent, or Firm*—William E. Meyer

(57) ABSTRACT

A lamp component has a support with a base surrounded by an interior wall defining a cavity with a central axis. A plurality of LEDs are supported on the interior wall and generally aimed to direct light towards the central axis. A center piece has a first reflective surface shaped and positioned to intercept light received from the LEDs and reflect such received light generally in a direction parallel to the axis.

9 Claims, 3 Drawing Sheets

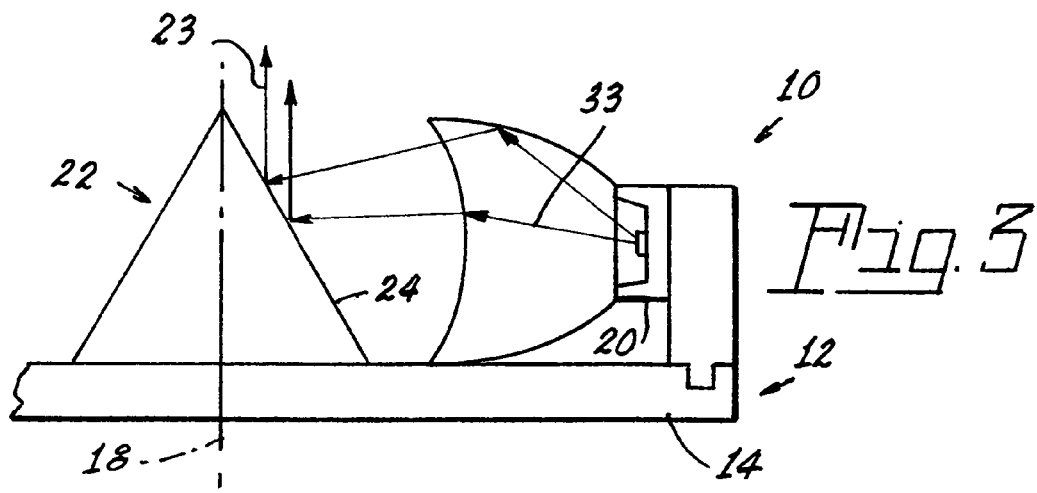
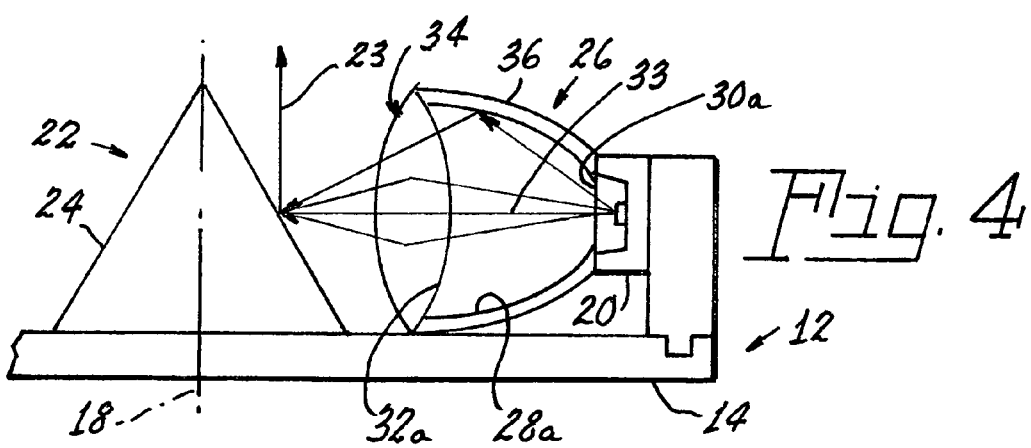
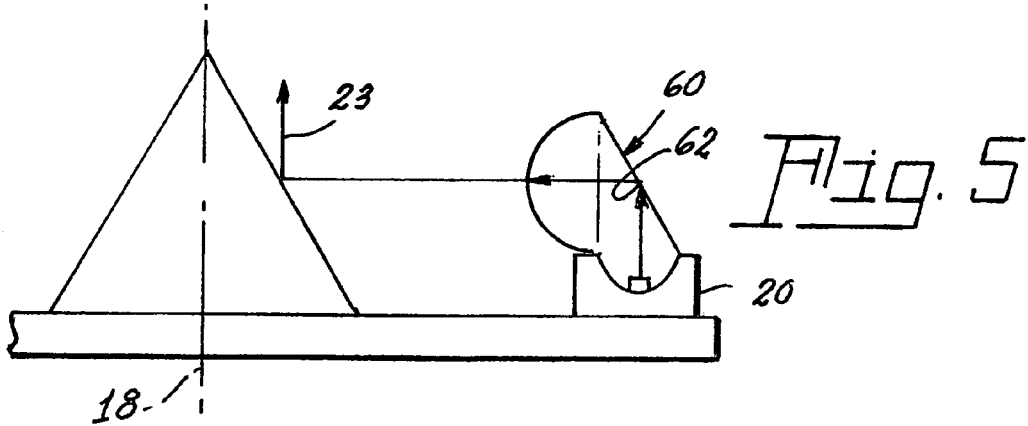

LIGHT EMITTING DIODE LAMP WITH CONICALLY FOCUSED LIGHT GUIDES

CROSS-REFERENCE TO RELATED APPLICATION

This application claims priority from Provisional Patent Application Ser. No. 60/580,411, filed Jun. 17, 2004.

TECHNICAL FIELD

This invention relates to light sources and more particularly to light sources employing light emitting diodes (LED or LEDs) and more particularly to light sources useful in the automotive field such as for headlights, taillights, stoplights, fog lights, turn signals, etc.

BACKGROUND ART

In the past, most automotive light sources have involved the use of incandescent bulbs. While working well and being inexpensive, these bulbs have a relatively short life and, of course, the thin filament employed was always subject to breakage due to vibration.

Recently some of the uses, particularly the stoplight, have been replaced by LEDs. These solid-state light sources have incredible life times, in the area of 100,000 hours, and are not as subject to vibration failures. It would be an advance in the art if the use of LED illumination could be expanded to other areas of automotive lighting, particularly if the emission of the light could be adequately controlled for specific purposes.

DISCLOSURE OF INVENTION

It is, therefore, an object of the invention to obviate the disadvantages of the prior art. It is another object of the invention to enhance LED lighting for automotive uses. These objects are accomplished, in one aspect of the invention, by a lamp component comprising; a support having a base surrounded by an interior wall defining a cavity with a central axis; a plurality of LEDs 20 supported on the interior wall and generally aimed to direct light towards the central axis; and a center piece with a first reflective surface shaped and positioned to intercept light received from the LEDs and reflect such received light generally in a direction parallel to the axis. The use of multiple LEDs directed toward a single optic allows for excellent control of the color and intensity of the emitted light. The construction also allows the LEDs to be mounted to a heat sink for efficient heat removal.

BRIEF DESCRIPTION OF THE DRAWINGS

FIG. 3 is an elevational, diagrammatic view of an alternate embodiment of the invention;

FIG. 4 is a similar view of yet another embodiment of the invention;

FIG. 5 is a similar view of still another embodiment of the invention;

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
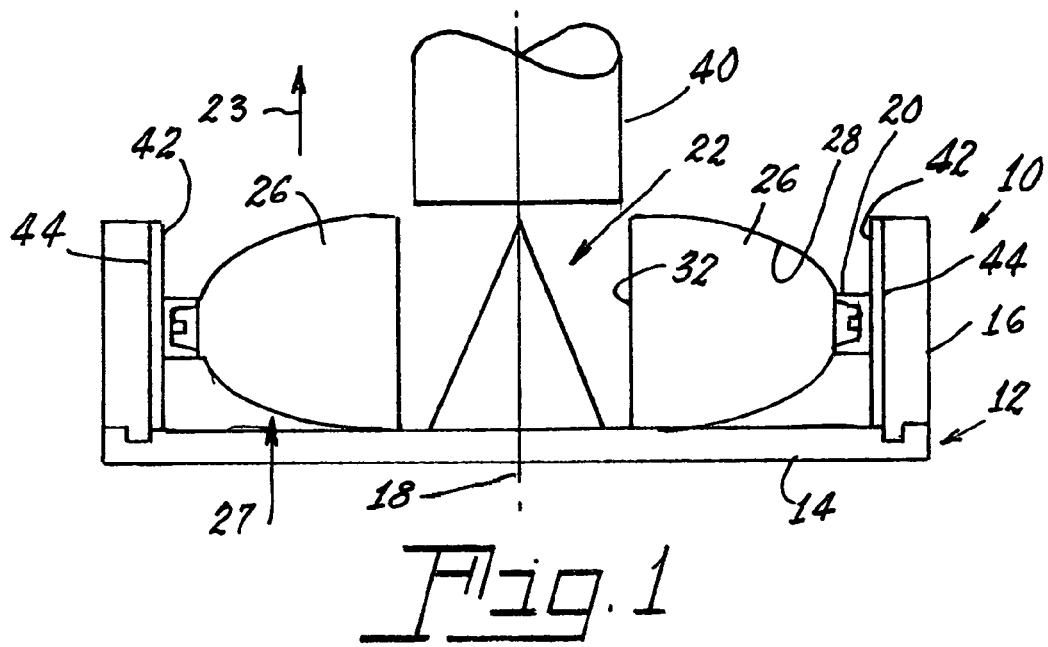
FIG. 1 is an elevational, diagrammatic view of an embodiment of the invention.

Referring now to the drawings with greater particularity, there is shown in FIG. 1 a lamp component 10 comprising; a support 12 having a base 14 surrounded by an interior wall 16 defining a cavity with a central axis 18. A plurality of LEDs 20 are supported on the interior wall 16 and generally aimed to direct light towards the central axis 18; and a center piece 22 is positioned about the central axis 18 and has a first reflective surface 24 shaped and positioned to intercept light received from the LEDs 20 and reflect such received light generally in a direction 23 parallel to the axis 18. The centerpiece 22 is preferably a mirrored cone.

The lamp component 10 in claim 1, further including one or more optical guides 26 located adjacent the respective LEDs 20, each respective optical guide 26 having a reflective surface 28 directing light towards the center piece 22.

The lamp component 10 includes one or more optical guides 26 located adjacent the respective LEDs 20, each respective optical guide 26 having a reflective surface 28 directing light towards the center piece 22. The optical guides 26 have light transmissive solid bodies 27 with an input surface 30 adjacent a respective LED 20 and an output widow 32 spaced from the input window and transmit light from the LED 20 and the internally reflective surface 28 to the first reflective surface 24.

Figure 2:
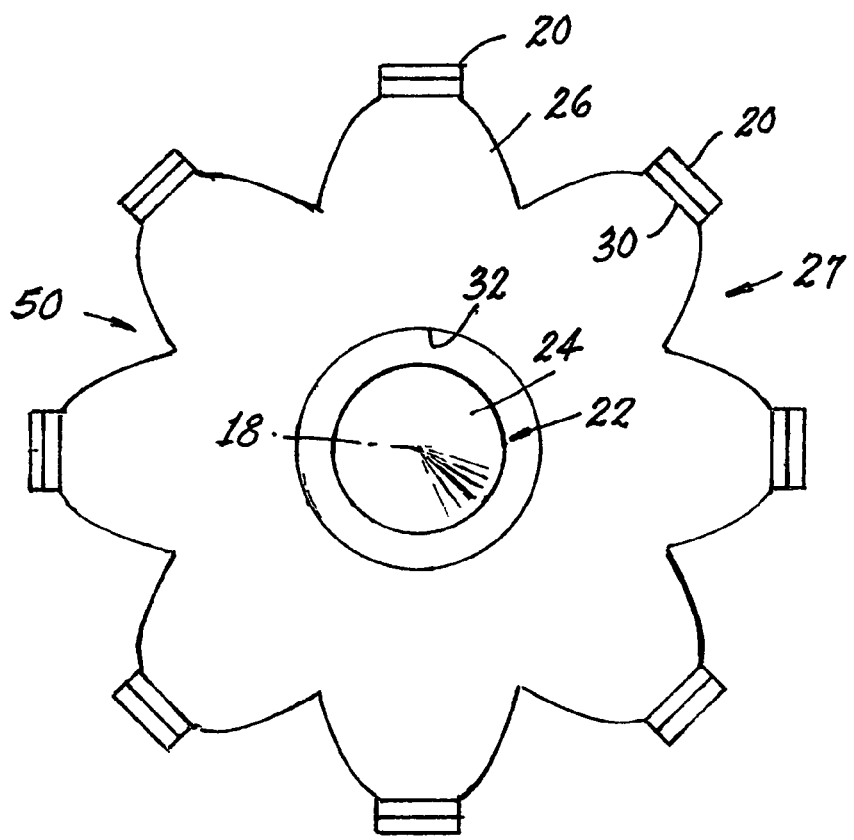
FIG. 2 is a plan view of one of the components of the lamp of FIG. 1.

The optical guides 26 can be individual units or they can be provided as a single piece 50, as shown in FIG. 2, with the units co-molded such that they can be fitted into the support 12 all at once.

The output window 32 that passes received light from the LED to the exterior in a direction 33 towards the first reflective surface can be provided with a lens 34 to focus light in the direction of the first reflective surface 24.

Referring now specifically to FIG. 4 there is shown an alternative to the solid optical guides wherein each optical guide 26 can be a hollow reflector body 36 with an input opening 30a adjacent a respective LED 20 to receive light therefrom, an having an internally reflective surface 28a directing the light from the LED 20 to an output widow 32a to the first reflective surface 24. The hollow reflector body 36 can also be used to direct light to the exterior in direction 33 towards a lens 34 to focus light in the direction of the first reflective surface 24.

A further embodiment is shown in FIG. 5 wherein the LEDs can be mounted upon the base 14 and have a reflector 60 mounted therewith to direct light that is emitted in a first direction parallel to the axis 18 to a second, transaxial direction to center piece 22 where the light is again directed in a direction 23 that is parallel to axis 18. Such a system would allow the use of side-emitting LEDs.

The support 12 includes heat-sinking features as are known to conduct heat generated by from the LEDs to an area away from the lamp component.

In any or all of the embodiments disclosed an optical element 40 can span the axial projection of the first reflector 22. The optical element can be a fiber optic, a lens, a light pipe or other optical directing or enhancing medium In a preferred embodiment of the invention the LEDs 20 are mounted on the interior surface 42 of a carrier 44, which can be a printed circuit board, and the optical guides 26 are substantially co-formed as a reflector body 50 glidingly fittable to the carrier 44. As noted above, the use of the reflector body 50 greatly simplifies alignment of the LEDs with their respective guide.

Figure 6:
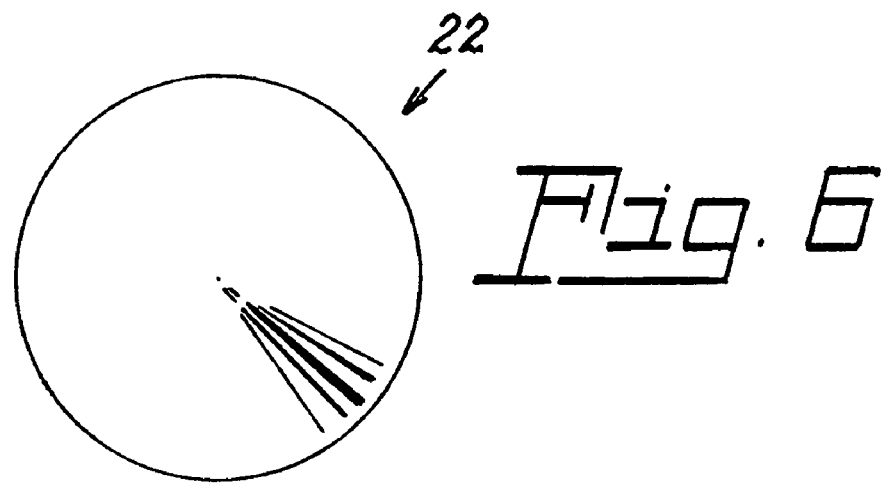
FIG. 6 is a plan view of an optical reflector employable with the invention.
Figure 7:
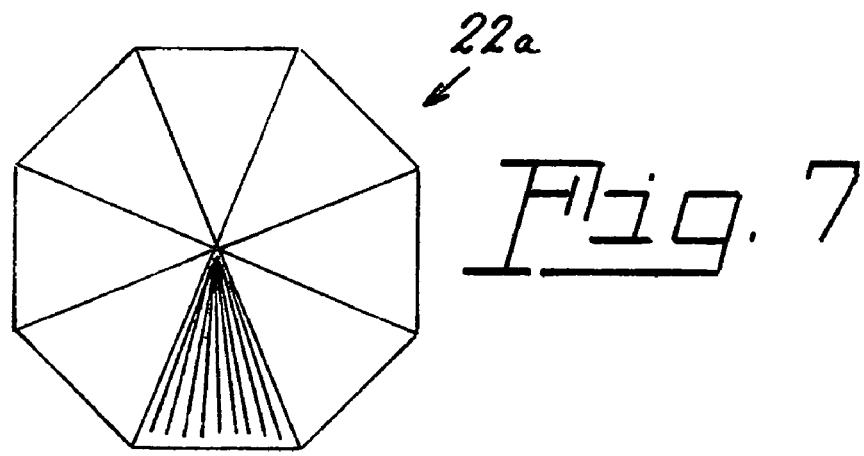
FIG. 7 is a view similar to FIG. 6 of an alternate embodiment of an optical reflector.
Figure 8:
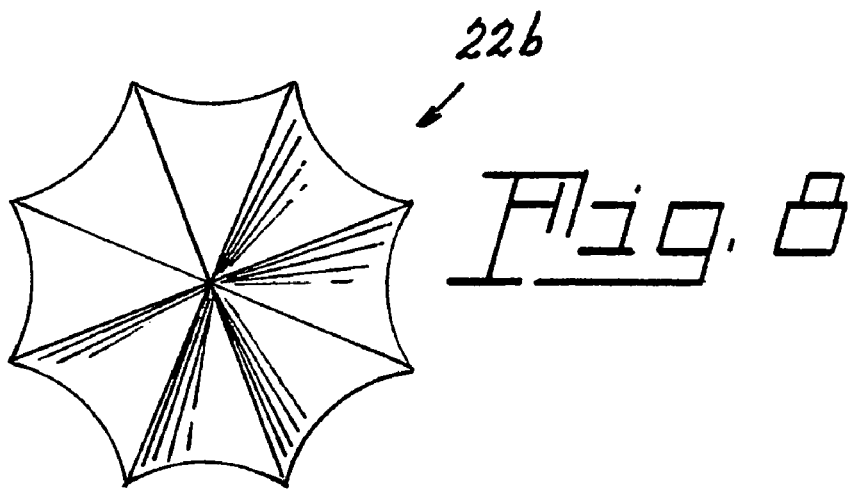
FIG. 8 is another view similar to FIG. 6 of yet another alternate embodiment of the invention.

Additional refinements are possible by appropriately choosing the outer configuration of the centerpiece 22. For example, as shown in FIG. 6 the centerpiece 22 can be a pure cone. Alternatively, as shown in FIG. 7 a centerpiece 22*a* can be a polygonal sided cone or, as shown in FIG. 8, a centerpiece 22*b* can be a polygonal cone with scalloped sides.

Accordingly, there is provided a lamp component that enhances LED use for automotive applications as well as being useful in other areas. The plurality of LEDs can be of multiple colors or single colors and the light therefrom can be directed to an optical element of varied configuration allowing for increasingly complex usage. The lamp component is efficient and economical to manufacture. Additional advantages reside in the spread of the LEDs, which provides for good heat dissipation while concentrating the light in a common beam. Heat sinking can be to the side, thereby keeping the axial dimension small While there have been shown and described what are present considered to be the preferred embodiments of the invention, it will be apparent to those skilled in the art that various changes and modifications can be made herein without departing from the scope of the invention as defined by the appended claims.

What is claimed is:

1. A lamp component comprising:
   a support having a base surrounded by an interior wall defining a cavity with a central axis;
   a plurality of LEDs supported on the interior wall and generally aimed to direct light towards the central axis; and
   a centerpiece with a first reflective surface shaped and positioned to intercept light received from the LEDs and reflect such received light generally in a direction parallel to the axis;
   further including one or more optical guides located adjacent the respective LEDs, each respective optical guide having a reflective surface directing light towards the center piece; and
   wherein the optical guides have light transmissive solid bodies with an input surface adjacent a respective LED to receive light therefrom, and having an internally reflective surface directing light and an output window transmitting light from the LED and the internally reflective surface to the first reflective surface, and
   wherein the solid bodies output window that passes received light from the LED to the exterior in a direction towards the first reflective surface has lens features to focus light in the direction of the first reflective surface.

2. A lamp component comprising:
   a support having a base surrounded by an interior wall defining a cavity with a central axis;
   a plurality of LEDs supported on the interior wall and generally aimed to direct light towards the central axis; and
   a centerpiece with a first reflective surface shaped and positioned to intercept light received from the LEDs and reflect such received light generally in a direction parallel to the axis;
   further including one or more optical guides located adjacent the respective LEDs, each respective optical guide having a reflective surface directing light towards the center piece; and
   wherein the optical guide is a hollow reflector body with an input opening adjacent a respective LED to receive light therefrom, an internally reflective surface directing light and an output window transmitting light from the LED and the internally reflective surface to the first reflective surface.

3. The lamp component in claim 2, wherein the hollow reflector body directs light to the exterior in direction towards a lens to focus light in the direction of the first reflective surface.

4. The lamp component in claim 2, wherein the support includes heat sinking features to conduct heat from the LEDs.

5. The lamp component in claim 2, further including an optical element spanning the axial projection of the first reflector.

6. The lamp component in claim 5, wherein the optical guide is a fiber optic.

7. The lamp component in claim 5, wherein the optical guide is a lens.

8. The lamp component in claim 5, wherein the optical guide is a light pipe.

9. The lamp component in claim 2, further wherein the LEDs are mounted on the interior surface of a carrier, and the optical guides are substantially co-formed as a reflector body glidingly fittable to the carrier.

* * * * *